US008048960B2

(12) United States Patent
Montoya-Goni et al.

(10) Patent No.: US 8,048,960 B2
(45) Date of Patent: Nov. 1, 2011

(54) MONOVINYLIDENE AROMATIC POLYMERS COMPRISING SULFANYLSILANE FUNCTIONALIZED ELASTOMERIC POLYMERS

(75) Inventors: Amaia Montoya-Goni, Bergen op Zoom (NL); Jose M. Rego, Houston, TX (US); Evemarie Hamann, Halle (DE); Sven K. H. Thiele, Halle (DE)

(73) Assignee: Styron Europe GmbH, Horgen (CH)

( * ) Notice: Subject to any disclaimer, the term of this patent is extended or adjusted under 35 U.S.C. 154(b) by 57 days.

(21) Appl. No.: 12/596,162

(22) PCT Filed: Mar. 27, 2008

(86) PCT No.: PCT/US2008/058336
§ 371 (c)(1),
(2), (4) Date: Oct. 16, 2009

(87) PCT Pub. No.: WO2008/130782
PCT Pub. Date: Oct. 30, 2008

(65) Prior Publication Data
US 2010/0087612 A1    Apr. 8, 2010

Related U.S. Application Data

(60) Provisional application No. 60/925,006, filed on Apr. 18, 2007, provisional application No. 61/032,171, filed on Feb. 28, 2008.

(51) Int. Cl.
*C08F 8/00* (2006.01)
*C08L 9/00* (2006.01)
*C08L 25/02* (2006.01)
*C08K 5/00* (2006.01)

(52) U.S. Cl. .......... 525/191; 525/232; 525/241

(58) Field of Classification Search .......... 525/191, 525/232, 241; 524/515
See application file for complete search history.

(56) References Cited

U.S. PATENT DOCUMENTS

| 3,123,655 | A |  | 3/1964 | Offing et al. |
| 4,071,577 | A |  | 1/1978 | Falender et al. |
| 4,409,369 | A |  | 10/1983 | Lyons et al. |
| 4,572,819 | A |  | 2/1986 | Priddy et al. |
| 4,585,825 | A |  | 4/1986 | Wesselmann |
| 4,666,987 | A |  | 5/1987 | Burmester et al. |
| 4,717,741 | A |  | 1/1988 | Hahnfeld et al. |
| 5,491,195 | A |  | 2/1996 | Schrader et al. |
| 5,721,320 | A |  | 2/1998 | Priddy et al. |
| 5,959,033 | A |  | 9/1999 | Demirors et al. |
| 6,229,036 | B1 |  | 5/2001 | Batz-Sohn et al. |
| 2008/0287601 | A1 | * | 11/2008 | Thiele et al. .............. 524/588 |

FOREIGN PATENT DOCUMENTS

| EP | 1777265 A | 5/2007 |
| WO | WO-00/3459 A | 6/2000 |
| WO | WO 2004/72137 A1 | 8/2004 |
| WO | WO 2006/011384 A | 2/2006 |
| WO | WO-2007/047943 | 4/2007 |

OTHER PUBLICATIONS

"Polybutadiene Hydroperoxide by Singlet Oxygen: Its Grafting and Morphology in Polystyrene Matrix" Journal of Applied Polymer Since, vol. 31, 1827-1842 (1986) by Peng.
Tanaka, et al. (Polymer, vol. 22, pp. 1721-1723 (1981)).
Journal of Applied Polymer Science, vol. 77 (2000), p. 1165, *"A novel application of Using a Commercial Fraunhofer Diffractometer to Size Particles Dispersed in a Solid Matrix."* By Jun Gao and Chi Wu.

* cited by examiner

*Primary Examiner* — Nathan M Nutter
(74) *Attorney, Agent, or Firm* — Brinks Hofer Gilson & Lione

(57) ABSTRACT

The present invention is a rubber modified monovinylidene aromatic polymer composition where the rubber is a sulfanylsilane chain end modified elastomeric polymer. In the present invention the functionalized rubber provides sufficient grafting levels in standard graft polymerization process technologies to prepare desired rubber particle size distributions and morphologies. Across a range of rubber modified monovinylidene aromatic polymers, it has been found that the use of the modified elastomeric polymers according to the present invention can improve the combinations of resin properties, particularly clarity, surface and physical properties, including both rubber modified monovinylidene aromatic homopolymers (e.g., high impact polystyrene and copolymers (e.g., ABS). The functionalized rubbers have sulfanyl functional groups that provide an optimized reactive grafting site. This ensures that under graft polymerization conditions a monovinylidene aromatic polymer block is formed grafted to the butadiene polymer block. This is particularly desirable to enable the use of polybutadiene homopolymer rubbers which are more cost effectively used in rubber-modified monovinylidene aromatic polymers.

20 Claims, No Drawings

MONOVINYLIDENE AROMATIC POLYMERS COMPRISING SULFANYLSILANE FUNCTIONALIZED ELASTOMERIC POLYMERS

This application claims benefit of U.S. Provisional Application No. 60/925,006, filed on Apr. 18, 2007 and U.S. Provisional Application No. 61/032,171, filed on Feb. 28, 2008.

This invention relates to improved rubber-modified monovinylidene aromatic polymers, including both rubber-modified monovinylidene aromatic homopolymers and rubber-modified monovinylidene aromatic copolymers. In its various aspects, the invention relates to rubber-modified monovinylidene aromatic polymers based on elastomeric polymers, also referred to herein as rubbers, that are functionalized or "chain end modified" using sulfanylsilanes, preparation of such rubber-modified monovinylidene aromatic polymers and articles made therefrom.

Rubber modified monovinylidene aromatic polymers, such as rubber modified polystyrene, also known as high impact polystyrene (HIPS), and rubber modified poly(styrene-acrylonitrile) known as ABS, cost effectively provide a range of physical properties that can be balanced to suit numerous applications. These types of polymers are used to make articles or materials for use in a large number of applications including food and drink containers, packaging, consumer electronics, appliances and the like. Such articles can be produced by a variety of methods including the known technologies for molding and thermoforming from sheet material. For use in these applications, such polymers require a balance of properties including good impact strength, tensile strength, processability, surface properties such as gloss and, in some cases, transparency properties.

Rubber modified monovinylidene aromatic polymers are typically produced by polymerizing the selected monomer(s), such as styrene or styrene/acrylonitrile in the presence of a dissolved rubber, such that the monomer polymerizes with some amounts forming free "matrix" polymer and some amounts grafting to the rubber molecules. The rubber becomes dispersed within the polymer matrix in the form of discrete rubber particles and eventually crosslinked, with the ability to obtain a varying range of particle sizes and morphologies depending primarily upon grafting and a number of reaction conditions. Standard polybutadiene rubbers, unless they can be sufficiently grafted, tend to result in large cellular rubber particles good for toughness but detrimental to clarity and gloss. Sufficient grafting levels and/or use of a copolymer rubber that simulates grafted polymer can result in smaller rubber particles that provide toughness and are efficient for clarity/gloss improvement.

There have been a number of previous attempts to increase the level of rubber grafting. One approach includes hydroperoxidation of a rubber using singlet oxygen (SO) which results in an added number of reactive grafting sites on the rubber backbone as shown in U.S. Pat. No. 4,717,741. Another approach includes a diene rubber having at least one stable free radical group as shown in U.S. Pat. No. 5,721,320.

Yet another approach involves generating SO from triphenylphosphite ozonides to increase the grafting onto a polybutadiene rubber for the preparation of polybutadiene-modified polystyrene, as disclosed in "Polybutadiene Hydroperoxide by Singlet Oxygen: Its Grafting and Morphology in Polystyrene Matrix", Journal of Applied Polymer Science, Vol. 31, 1827-1842 (1986) by Peng. U.S. Pat. No. 5,959,033 discloses a method of producing highly grafted rubber in high impact styrene polymers using SO by decomposition of phosphite ozonides in the vinyl aromatic monomer and rubber feed of a mass polymerization process, such that at least 30 percent grafting is achieved at the point of phase inversion. However, this process requires the additional ozonide reactant and adds complexity to the reaction process.

In WO 2004/72,137A1 functionalized rubbers are shown typically having added unsaturated groups, such as (meth) acrylate groups, in the main chain of the rubber.

U.S. Pat. No. 6,229,036 discloses a broad class of sulfanylsilanes prepared by reacting mercaptosilanes with chlorosilanes, and their combination with a post-terminated elastomeric polymer during rubber compounding to produce tire treads having low rolling resistance and good wet grip.

Commonly assigned copending U.S. Patent Application 60/728,174, filed 19 Oct. 2005, now published as WO-2007/047943; teaches sulfanylsilane modification of elastomeric polymer chain ends by reacting a sulfanylsilane with a living anionic elastomeric polymer, which modified elastomeric polymers are taught to be suited for use in preparing vulcanized elastomeric polymer compositions, and articles made from such compositions such as pneumatic tires, tire treads, belts, footwear and the like.

There is always the need, however, for rubber modified monovinylidene aromatic polymer resins having improved property combinations, especially in the areas of toughness, clarity/gloss and processability.

In the present invention, therefore, a functionalized elastomeric polymer is used that provides sufficient and optimized grafting levels in standard production process technologies to prepare rubber particle morphologies that improve the combination of resin properties, in one embodiment, particularly the clarity properties in certain rubber-modified polystyrene resins. The functionalization is done using a sulfanylsilane compound to provide one terminal sulfanyl functional group per elastomeric polymer molecule (which may include more than one branch or chain), which functional group then provides an optimized reactive grafting site. This ensures that a di-block, grafted copolymer is formed, made up from the elastomeric polymer molecule block and the grafted monovinylidene aromatic monomer. This is particularly desirable to enable the use of polybutadiene homopolymer rubbers as the elastomeric polymer, which polybutadiene rubbers are cost effectively used in rubber-modified monovinylidene aromatic polymers.

The present invention is, therefore, a rubber modified monovinylidene aromatic polymer composition comprising: a) a monovinylidene aromatic polymer; and b) from about 1 to about 40 percent by weight sulfanylsilane modified elastomeric polymer dispersed as particles grafted with monovinylidene aromatic polymer. In another embodiment this polymer composition comprises grafted sulfanylsilane modified elastomeric polymer as represented by the following formula:

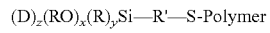

(D)$_z$(RO)$_x$(R)$_y$Si—R'—S-Polymer wherein: D is an elastomeric polymer chain; x is an integer selected from 0, 1 and 2; y is an integer selected from 0, 1, and 2; z is an integer selected from 1, 2 and 3; x+y+z=3; Si is silicon; S is sulfur; O is oxygen; R is the same or different and is (C$_1$-C$_{16}$) alkyl; R' is aryl, and alkyl aryl, or (C$_1$-C$_{16}$) alkyl; and Polymer is graft polymerized monovinylidene aromatic polymer. In further embodiments D, in the elastomeric polymer, is a conjugated diene polymer chain; a conjugated diene homopolymer rubber chain; a polybutadiene chain; or a styrene-butadiene copolymer chain.

In other embodiments at least about 70 percent of the elastomeric polymer particles have a core/shell morphology, the volume average particle size of the dispersed elastomeric polymer particles is from about 0.05 to about 10 microns. In other embodiments the monovinylidene aromatic matrix polymer is polystyrene and preferably, independently, comprises from about 3 to about 15 percent by weight elastomeric polymer and/or the volume average particle size of the elastomeric polymer is from about 0.4 to about 1.5 microns. In alternative embodiments, the monovinylidene aromatic matrix polymer is poly(styrene-acrylonitrile) and desirably, it comprises from about 5 to about 20 percent by weight elastomeric polymer and/or the volume average particle size of the elastomeric polymer is from about 0.3μ to about 4 microns.

In a further embodiment, the present invention is a process for preparing a rubber modified monovinylidene aromatic polymer composition comprising polymerizing the monovinylidene aromatic polymer in the presence of from about 1 to about 40 percent by weight sulfanylsilane modified elastomeric polymer which, in one embodiment, has the composition represented as: $(D)_z(RO)_x(R)_y Si-R'-S-SiR_3$ and $(D)_z(RO)_x(R)_y Si-R'-S-H$ wherein: D is an elastomeric polymer chain; x is an integer selected from 0, 1 and 2; y is an integer selected from 0, 1, and 2; z is an integer selected from 1, 2 and 3; x+y+z=3; Si is silicon; S is sulfur; O is oxygen; R is the same or different and is $(C_1-C_{16})$ alkyl; and R' is aryl, and alkyl aryl, or $(C_1-C_{16})$ alkyl. In one embodiment of this process, in the elastomeric polymer, D is a polybutadiene chain.

Other embodiments of the present invention include thermoformed articles and injection molded articles prepared from a polymer composition as described above.

In the present invention the functionalized rubber provides sufficient grafting levels in standard graft polymerization process technologies to prepare desired rubber particle size distributions and morphologies. Across a range of rubber modified monovinylidene aromatic polymers, it has been found that the use of the modified elastomeric polymers according to the present invention can improve the combinations of resin properties, particularly clarity, surface and physical properties, including both rubber modified monovinylidene aromatic homopolymers (e.g., high impact polystyrene and copolymers (e.g., ABS). The functionalized rubbers have sulfanyl functional groups that provide an optimized reactive grafting site. This ensures that under graft polymerization conditions a monovinylidene aromatic polymer block is formed grafted to the butadiene polymer block. This is particularly desirable to enable the use of polybutadiene homopolymer rubbers which are more cost effectively used in rubber-modified monovinylidene aromatic polymers.

The key feature of the present invention is the use of a sulfanylsilane-modified elastomeric polymer or "rubber" in an otherwise conventional rubber-modified monovinylidene aromatic polymer. The rubbers can be sulfanylsilane-modified by reacting a sulfanylsilane (also referred to as a "silane-sulfide") with a living anionic elastomeric polymer as shown in commonly assigned copending U.S. patent application Ser. No. 06/728,174, now published as WO-2007/047943, which is incorporated herein in full by reference.

The elastomeric polymers that can be functionalized for use according to the present invention include the known types of elastomeric or rubbery polymers that are during polymerization (or afterwards can be) modified to have a single terminal, living anionic functionality. The term "elastomeric polymers" is intended to mean elastomers or rubbers, including cross-linkable polymers, that when cross-linked, have properties similar to vulcanized natural rubber (cis-1,4-polyisoprene), for example, stretch under tension and retract relatively quickly to approximately the original length when released. In particular, it is intended to mean elastomeric or rubbery polymers that, when incorporated by graft polymerization into a monovinylidene aromatic polymer, provide increased toughness or impact resistance as measured by at least one standard test method such as Izod or dart impact.

Preferred functionalized elastomeric polymers are chain end modified elastomeric polymers prepared from modification of a living anionic elastomeric polymer with a silane-sulfide modifier. As discussed herein, the terms "chain end modified elastomeric polymer," "chain end modified polymer," "chain end modified elastomer," "modified elastomeric polymer," "functionalized rubber" and similar terms, as used herein, refer to the reaction product of a "living anionic elastomeric polymer" with a silane-sulfide modifier, as shown in Formula 1 or Formula 2 below. One, or more than one, polymer chain may react with one silane-sulfide modifier (see also Formula 5).

The use of lithium initiators to polymerize conjugated diene, triene, and monovinyl aliphatic and aromatic monomers is well known. These polymerizations proceed according to anionic polymerization mechanisms, wherein the reaction of monomers, by nucleophilic initiation, form and propagate a polymeric structure. Throughout the polymerization, the polymer structure is ionic or "living." Thus, the polymer structure has at least one reactive or "living" end. This is the context of the term "living," as used herein, to describe the subject elastomeric polymers. Thus, as discussed above, the term "living anionic elastomeric polymer," as used herein, refers to a polymer comprising polymer chains, in which each chain contains a reactive anionic end group located at "at least one end" of the polymer chain. This term is known in the art.

In one embodiment, the living anionic elastomeric polymer is selected from the living polymers of conjugated diene monomers, including the group consisting of homopolymers of isoprene, homopolymers of butadiene, copolymers of butadiene with styrene, copolymers of isoprene with styrene, terpolymers butadiene with isoprene and styrene, and combinations thereof. In another embodiment, the living anionic elastomeric polymer is selected from the group consisting of homopolymers of butadiene and copolymers of butadiene with styrene.

Monomers useful in preparing the subject elastomeric polymers include conjugated olefins and olefins chosen from the group comprising α-olefins, internal olefins, cyclic olefins, polar olefins and nonconjugated diolefins. Suitable conjugated unsaturated monomers are preferably conjugated dienes, such as: 1,3-butadiene and isoprene (2-methyl-1,3-butadiene). Preferred conjugated dienes include: butadiene, isoprene and cyclopentadiene, and preferred aromatic α-olefin comonomers include: styrene and 4-methylstyrene.

Examples of applicable elastomeric polymers include homopolymers of conjugated dienes, especially butadiene or isoprene, and random or block co- and terpolymers of at least one conjugated diene, especially butadiene or isoprene, with at least one aromatic α-olefin, especially styrene and 4-methylstyrene, aromatic diolefin, especially divinylbenzene. Especially preferred is the random copolymerization, optionally terpolymerization, of at least one conjugated diene with at least one aromatic α-olefin, and optionally, at least one aromatic diolefin or aliphatic α-olefin, especially butadiene or isoprene with styrene, 4-methylstyrene and/or divinylbenzene. The terms "functionalized rubbers," "modified elastomeric polymers" and "modified polymers" refer to these elastomeric polymers when they are "chain end modified" as discussed above.

In general, for the production of the elastomeric polymer, the polymerization of the diene monomer(s) or copolymerization of the diene monomer(s) with the α-olefin monomer(s) may be accomplished at conditions well known in the art for anionic living type polymerization reactions.

To further control polymer molecular weight and polymer properties, a coupling agent or linking agent (in addition to the sulfanylsilane modifier) may be employed. For example, a tin halide, a silicon halide, a tin alkoxide, a silicon alkoxide, or a mixture of the aforementioned compounds, can be continuously added during the polymerization, in cases where asymmetrical coupling is desired. Common halide coupling agents include tin tetrachloride, tin tetrabromide, tin tetrafluoride, tin tetraiodide, silicon tetrachloride, silicon tetrabromide, silicon tetrafluoride, silicon tetraiodide, tin and silicon trihalides or tin and silicon dihalides can also be used. Polymers coupled with tin or silicon tetrahalides have a maximum of four arms (or four coupled polymer chains), tin and silicon trihalides have a maximum of three arms and tin and silicon dihalides have a maximum of two arms. Hexahalo disilanes or hexahalo disiloxanes can also be used as coupling agents resulting in polymers with a maximum of six arms. Useful tin and silicon halides coupling agents include: $SnCl_4$, $(R_1)_3SnCl$, $(R_1)_2SnCl_2$, $R_1SnCl_3$, $SiCl_4$, $(R_1)_3SiCl$, $(R_1)_2SiCl_2$, $R_1SiCl_3$, $Cl_3Si—SiCl_3$, $Cl_3Si—O—SiCl_3$, $Cl_3Sn—SnCl_3$, $Cl_3Sn—O—SnCl_3$. Examples of tin and silicon alkoxides coupling agents include: $Sn(OMe)_4$, $Si(OMe)_4$, $Sn(OEt)_4$ or $Si(OEt)_4$. The most preferred coupling agents are: $SnCl_4$, $SiCl_4$, $Sn(OMe)_4$ and $Si(OMe)_4$.

In one embodiment, the chain end modified elastomeric polymer further comprises at least one coupling agent, selected from the group consisting of tin halide, tin alkoxide, silicon halide, and silicon alkoxide.

Preferably, in one embodiment, the chain end modified elastomeric polymer does not comprise a coupling or linking agent as defined above in addition to the sulfanylsilane modifier.

The terms "chain end modifier", "end cap modifier", "modifying agent", "modifying compound", and simply "modifier" are all intended to mean the subject silane-sulfide or sulfanyl silane compounds described herein, with reference to Formulae 1 and 2 below. The terms "chain end modified elastomeric polymer" and "modified elastomeric polymer" are both intended to mean the reaction product of a living (anionic) elastomeric polymer with a subject chain end modifier.

The subject modifier includes compounds according to Formula 1:

GJMSi-A-S—SiTXZ         (Formula 1), wherein:

Si is silicon; S is sulfur; G is $(C_1-C_{16})$ alkoxy, preferably a $(C_1-C_{10})$ alkoxy, more preferably a $(C_1-C_6)$ alkoxy, and even more preferably a $(C_1-C_4)$ alkoxy; and J and M are the same or different, and are each independently selected from the group consisting of: hydrogen (H), $(C_1-C_{16})$ alkyl, $(C_1-C_{16})$ alkoxy, $(C_7-C_{16})$ aryl, $(C_7-C_{16})$ alkylaryl, and -A-S—SiTXZ (where A, T, X and Z are defined below); but are preferably independently selected from $(C_1-C_5)$ alkyl and $(C_1-C_5)$ alkoxy.

A is an aryl, an alkylaryl, a $(C_7-C_{16})$ alkylaryl, or a $(C_1-C_{16})$ alkyl which may be linear or branched, saturated or unsaturated and may be substituted with: $(C_1-C_4)$ alkyl, $(C_1-C_4)$ alkoxy, $(C_7-C_{16})$ aryl, $(C_7-C_{16})$ aralkyl, nitrile, amine, $NO_2$, thioalkyl, -A-S—SiTXZ (where A, T, X and Z are defined herein), but is preferably a linear or branched $(C_1-C_5)$ alkyl. The designations, $(C_1-C_n)$ or $(C_7-C_n)$, where n is the upper carbon limit, as used herein, refers to the total number of carbon atoms within the "A" group. A preferably does not contain a heteroatom, such as O, N, P or S. In a preferred embodiment, the A group, when an alkyl, contains three to five carbon atoms.

The T, X and Z groups are the same or different, and are each independently selected from the group consisting of: hydrogen (H), $(C_1-C_{16})$ alkyl, $(C_1-C_{16})$ alkoxy, $(C_7-C_{16})$ aryl, $(C_7-C_{16})$ aralkyl, and —S-A-SiMJG (A, M, J and G are defined as described herein). Preferably T, X and Z are independently selected from $(C_1-C_5)$ alkyl and $(C_1-C_5)$ alkoxy, and more preferably T, X and Z are each a $(C_1-C_5)$ alkyl group.

While not shown in Formula 1, it will be understood that the subject compounds may also include their corresponding Lewis base adducts (for example, with solvent molecules tetrahydrofurane, dieethylether, dimethoxyethane coordinated with silicon atoms).

In a preferred embodiment of the invention, the modifier as depicted in Formula 1 (see above) and Formula 2 (see below) does not contain a halide moiety, and more preferably does not contain chloride, which can potentially form corrosive by-products.

The term "alkyl" is understood to include both straight chain hydrocarbons, (for example, methyl (Me), ethyl (Et), n-propyl (Pr), n-butyl (Bu), n-pentyl, n-hexyl, etc.), branched hydrocarbon groups (e.g. isopropyl, tert-butyl, etc.) and hydrocarbon based non-aromatic rings. These hydrocarbon groups may be optionally substituted with alkyl, alkoxy, hydroxyl, or other heteroatoms, such as nitrogen, sulfur and phosphorous, but preferably do not contain heteroatom-containing substitutions.

The term "alkoxy" is understood to include methoxy (MeO), ethoxy (EtO), propoxy (PrO), butoxy (BuO), isopropoxy, isobutoxy, pentoxy, and the like.

The term "aryl" is understood to include phenyls, biphenyls and other benzenoid compounds, optionally substituted with alkyl, alkoxy, hydroxyl, or other heteroatoms, such as nitrogen, sulfur and phosphorous. The aryl groups as defined in Formula 1, preferably contain no heteroatom substitution, and even more preferably contain only one aromatic ring, and most preferably contain a six carbon aromatic ring.

The term "alkylaryl" is understood to mean an aryl group bonded to an alkyl group. The designation of $(C_7-C_{16})$ and similar designations, are intended to mean the total number of carbon atoms within the group. The alkylaryl groups as defined in Formula 1 preferably contain no heteroatom substitution, and even more preferably contain only one aromatic ring, and most preferably contain a six carbon aromatic ring.

More preferably, the subject modifier is selected from the class defined by Formula 2:

$(RO)_x(R)_ySi—R'—S—SiR_3$         (Formula 2), wherein:

O is oxygen, x is an integer selected from 1, 2 and 3, preferably is 2 or 3 and more preferably is 3; y is an integer selected from 0, 1, and 2; x+y=3.

R is the same or different and is: $(C_1-C_{16})$ alkyl, preferably $(C_1-C_8)$ alkyl and more preferably $(C_1-C_5)$ alkyl especially including: Me, Et, Pr and Bu; and R' is $(C_1-C_{16})$ alkyl, preferably $(C_1-C_5)$ alkyl.

R' is equivalent to the "A" group, and is thus defined accordingly, as discussed above.

In a preferred embodiment, each R group is the same or different, and each is independently a $(C_1-C_5)$ alkyl, and R' is $(C_1-C_5)$ alkyl.

While not shown in Formula 2, it will be understood that the subject compounds include their corresponding Lewis base adducts (e.g. with solvent molecules tetrahydrofurane, dieethylether, dimethoxyethane coordinated with silicon atoms). Specific preferred species of the subject modifier include the compounds (and their corresponding Lewis base adducts which are not shown) represented by the following formulae: (MeO)$_3$Si—(CH$_2$)$_3$—S—SiMe$_3$, (EtO)$_3$Si—(CH$_2$)$_3$—S—SiMe$_3$, and (PrO)$_3$Si—(CH$_2$)$_3$—S—SiMe$_3$.

The modifiers of the present invention may be prepared as described in copending patent application No. 60/728,174 now published as WO-2007/047943.

The subject modifier includes the sulfanylsilane compounds described in U.S. Pat. No. 6,229,036 (which, to the fullest extent permitted by law, is incorporated herein by reference, including the methods for preparing sulfanylsilane compounds). Of the sulfanylsilane compounds disclosed, those without halogens are preferred.

The chain end modification reaction, including the recovery of the modified elastomeric polymer from the reaction mixture and depending on reaction and recovery conditions, is believed to provide a chain end modified elastomeric polymer according to Formula 5a (having terminal sulfide) or according to Formula 5b (having terminal thiol) or a mixture comprising species having chain end modified elastomeric polymer represented by both Formulae 5a and 5b (collectively referred to as Formula 5):

(D)$_z$(RO)$_x$(R)$_y$Si—R'—S—SiR$_3$ (Formula 5a),

(D)$_z$(RO)$_x$(R)$_y$Si—R'—S—H (Formula 5b), wherein D is an elastomeric polymer, x is an integer selected from 0, 1 and 2; y is an integer selected from 0, 1, and 2; z is an integer selected from 1, 2 and 3, preferably is 2 or 3 and more preferably is 3, and x+y+z=3, and all other symbols are as previous defined with respect to Formula 2. As discussed in more detail below, the modified elastomeric polymer referred to herein is a chain end modified elastomeric polymer according to Formula 5a or according to Formula 5b or a mixture of the species as represented by Formulae 5a and 5b. While not shown in Formula 5, it will be understood that the subject compound(s) include their corresponding Lewis base adducts. In some preferred embodiments, the chain end modified polymer may be partially coupled via reaction with the aforementioned coupling agent(s).

The resulting modified elastomeric polymers preferably comprises the reactive sulfur-containing sulfide and/or thiol groups in amounts of at least about 0.00010 mmol/gram of elastomeric polymer, preferably at least about 0.00025, more preferably at least about 0.0005, and more preferably at least about 0.001 mmol/gram of elastomeric polymer and generally less than or equal to about 0.20 mmol/gram of elastomeric polymer, preferably less than or equal to about 0.10 mmol/gram, and more preferably less than or equal to about 0.008 mmol/gram.

For most applications, the modified polymer is preferably a homopolymer derived from a conjugated diolefin with reactive sulfide and/or thiol groups bonded to at least some polymer chain ends. Preferred chain end modified polymers (or modified elastomeric polymers) include, but are not limited to, chain end modified polybutadiene and chain end modified polyisoprene, but can include chain end modified butadiene-styrene copolymers, chain end modified butadiene-isoprene copolymers, chain end modified isoprene-styrene copolymers and chain end modified butadiene-isoprene-styrene terpolymers.

While not wishing to be bound by theory, the trialkylsilyl (—SiR$_3$) group of the modified elastomeric polymers of Formula 5a is believed to function as a protective group which prevents unintended subsequent reaction of the sulfide prior to the use of the elastomeric polymer to prepare the rubber modified monovinylidene aromatic polymer. This "protective" trialkylsilyl (—SiR$_3$) may be unintentionally or intentionally removed by exposure to a compounds containing —OH groups such water, alcohols, anionic acids or organic acids, (e.g. hydrochloric acid, sulfuric acid or carboxylic acids), thus forming an "unprotected" thiol (—SH) group as shown in Formula 5b. Such conditions are typically present or created during the work up of the elastomeric polymer, i.e. its recovery and purification from its polymerization process. Depending on the polymer "work up" conditions, amounts of both the unprotected and protected modified elastomeric polymers are believed to be present in the typical modified elastomeric polymers that are employed in the monovinylidene aromatic polymers according to the present invention. For example, steam stripping of the polymer solution containing the modified polymer largely according to Formula 5a will remove a percentage of the protecting trialkyl silyl groups resulting in the unprotected form 5b with the thiol (—SH) group exposed.

It is expected that both the protected and unprotected sulfanyl silane modified elastomeric polymers will react and provide improved grafting onto the elastomeric polymer in the preparation of the monovinylidene aromatic polymers according to the present invention with the Formula 5b specie or a mixture that includes this specie being preferred. As used herein, therefore, the "sulfanyl silane modified elastomeric polymer" or "modified elastomeric polymer" component will include the protected sulfanylsilane modified elastomeric polymer, the unprotected sulfanylsilane modified elastomeric polymer or, more commonly, a mixture of amounts of both the "protected" and "unprotected" sulfanylsilane modified elastomeric polymer.

Then, according to non-binding theory, when the modified elastomeric polymer (e.g., Rubber-S—H) is employed in the monovinylidene aromatic polymer polymerization reaction, the mercapto group on the elastomeric polymer (shown here as "unprotected") will undergo chain transfer reaction with the polymerizing monovinylidene aromatic polymer radicals ("Polymer radical°") according to reaction below consequently incorporating a graft of the monovinylidene aromatic polymer onto the elastomeric material.

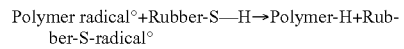
Polymer radical°+Rubber-S—H→Polymer-H+Rubber-S-radical°

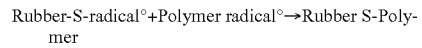
Rubber-S-radical°+Polymer radical°→Rubber S-Polymer

In either of the Formula 5 variations, the use of the modified elastomeric polymer in preparing the rubber modified monovinylidene aromatic polymer in a graft polymerization process results in graft copolymer generally represented by the following Formula 6 wherein "Polymer" represents grafted monovinylidene aromatic polymer and with the same definitions as Formula 5:

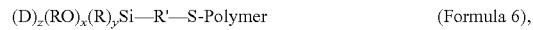
(D)$_z$(RO)$_x$(R)$_y$Si—R'—S-Polymer (Formula 6),

As is well known to those skilled in the art, this graft copolymer species provides improved compatibility between the elastomeric polymer and monovinylidene aromatic polymer phases and enables the production of desirable sizes and morphologies for the particles or domains of elastomeric polymer that become dispersed in the matrix monovinylidene aromatic polymer phase.

The modified elastomeric polymers suitable for use in the monovinylidene aromatic polymers according to the present invention are those that have a solution viscosity in the range of 5 to 300 milliPascal seconds (mPa·s) (equivalent to centapoise or cps) (measured according to ASTM 445 (or DIN 51562) in a 5% solution in styrene at 25° C. using a Ubelohde capillary III (range 100-1000 mPa·s); IIc (range 30-300 mPa·s); II (10-100 mPas); or Ia (5-50 mPas). Preferably the solution viscosity is at least 10, preferably at least 30 mPa·s and, independently, is less than or equal to 300, preferably less than or equal to 250 and more preferably less than or equal to 200 mPa·s.

The modified elastomeric polymers, prior to incorporation into the graft copolymerization processes, preferably have Mooney viscosity values (ML 1+4, 100° C., as measured in accordance with ASTM D 1646 (2004)) using a Monsanto MV2000 instrument in the range of from about 5 to about 150. Preferably the Mooney viscosity will be at least about 10, more preferably at least about 15 and preferably less than or equal to about 120, more preferably less than or equal to about 100.

The weight average molecular weight (Mw) of the rubber polymer is generally from 10,000 to 1,000,000, typically from 30,000 to 800,000, preferably from 40,000 to 700,000, more preferably from 45,000 to 600,000, and most preferably from 50,000 to 500,000 as measured by gel permeation chromatography (GPC) and calculated versus polystyrene standards The rubbers preferably employed in the practice of the present invention are those polymers and copolymers which exhibit a second order transition temperature (also referred to as a glass transition temperature or Tg) which is less than or equal to 0° C., preferably less than or equal to −50° C. and more preferably less than or equal to −60° C. (especially for polybutadiene) as determined or approximated using conventional techniques, for example, ASTM Test Method D-746-52 T.

Although there are no specific limitations regarding the cis content of the conjugated diolefin remnant portion of the elastomeric polymer, for most applications the cis content is preferably at least about 10 weight percent based on conjugated diolefin in the elastomeric polymer, more preferably at least about 20 weight percent, and generally less than or equal to about 80 weight percent; preferably less than or equal to about 60 weight percent based on conjugated diolefin in the elastomeric polymer.

Although there are no specific limitations regarding the amount of aromatic vinyl monomer (if used) in the modified elastomeric polymer, in most applications the aromatic vinyl monomers comprise from 5 to 60 weight percent of the total monomer content, and more preferably, if used, from 10 to 50 weight percent. Values less than 5 weight percent would provide little or no benefit versus their added cost. If it is a copolymer, the modified elastomeric polymer may be a block or random copolymer, but preferably 40 weight percent or more of the aromatic vinyl compound units are linked singly (i.e. random), and 10 weight percent or less are of "blocks" in which eight or more aromatic vinyl compounds are linked successively. The length of successively linked aromatic vinyl units can be measured by an ozonolysis-gel permeation chromatography method developed by Tanaka, et al. (Polymer, Vol. 22, Pages 1721-1723 (1981)).

The molecular weight distribution of the subject modified elastomeric polymer, prior to graft polymerization processes has not been found to be very critical and the suitable ranges are known to those skilled in the art for this type of application. Generally the molecular weight distribution as represented by the ratio of the weight average molecular weight to the number average molecular weight, (Mw/Mn), will be at least about 1.02, preferably at least about 1.05, more preferably at least about 1.2; more preferably at least about 1.3 and is generally less than equal to about 4.0, preferably less than or equal to about 3.0, and more preferably less than or equal to about 2.5. If Mw/Mn is more than 4.0, however, the content of low molecular weight components increases and gels and tackiness may result.

The monovinylidene aromatic homopolymers and copolymers (collectively referred to as "polymers" or "(co)polymers") which are rubber-modified with the above-described modified elastomeric polymers are produced by polymerizing monovinylidene aromatic monomers such as those described in U.S. Pat. Nos. 4,666,987, 4,572,819 and 4,585, 825, which are herein incorporated by reference. The monovinylidene aromatic monomer suitable for use in the matrix polymer component, graft polymerization onto the rubber and copolymerization into the copolymer rubber component is preferably of the following formula:

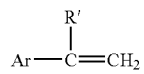

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical monovinylidene aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof with styrene being the most preferred. The monovinylidene aromatic monomer suitable for use in the matrix polymer component can be copolymerized with minor amounts of up to about 40 weight percent of one or more of a range of other copolymerizable monomers. Preferred comonomers include nitrile monomers such as acrylonitrile (to provide "ABS" types of resins), methacrylonitrile and fumaronitrile; (meth)acrylate monomers such as methylmethacrylate or n-butyl acrylate; maleic anhydride and/or N-arylmaleimides such as N-phenylmaleimide. If a copolymer is employed, depending upon the particular comonomer, preferred copolymers contain at least about 60, preferably at least about 70, more preferably at least about 80, preferably at least about 90 weight percent monovinylidene aromatic monomer based on weight copolymerizable monomer.

The monovinylidene aromatic polymer matrix component of the resin compositions according to the present invention typically have a sufficiently high weight average molecular weight (Mw) to provide the required level of processability and mechanical properties in the composition, which is typically a Mw of at least about 100,000, preferably at least about 120,000, more preferably at least about 130,000 and most preferably at least about 140,000 grams per mole (g/mol).

The monovinylidene aromatic polymer component of the resin compositions according to the present invention typically have an Mw that is less than or equal to about 400,000, preferably less than or equal to about 300,000, more preferably less than or equal to about 250,000 and most preferably less than or equal to about 230,000 grams per mole (g/mol) in order to provide sufficient processability.

The monovinylidene aromatic polymer component of the resin compositions according to the present invention typically have a number average molecular weight (Mn) of at least about 30,000 preferably at least about 40,000, more preferably at least about 50,000 and most preferably at least about 60,000 grams per mole (g/mol).

The monovinylidene aromatic polymer component of the resin compositions according to the present invention typically have a Mn that is less than or equal to about 130,000 preferably less than or equal to about 120,000, more preferably less than or equal to about 110,000 and most preferably less than or equal to about 100,000 grams per mole (g/mol).

Along with these values for Mw and Mn, the ratio of Mw/Mn, also referred to as the polydispersity or molecular weight distribution, should desirably be at least about 2, preferably greater than or equal to 2.3 and less than or equal to 4, preferably less than or equal to 3. As used herein, the terms Mw and Mn for the monovinylidene aromatic polymer refer to weight and number average molecular weights as determined by gel permeation chromatography using a polystyrene standard for calibration.

The rubber modified monovinylidene aromatic polymers or copolymers are produced by known methods of polymerizing monovinylidene aromatic monomers in the presence of a pre-dissolved elastomer, examples of which are described in U.S. Pat. Nos. 3,123,655 and 4,409,369, which are incorporated by reference herein. In particular, a preferred rubber modified monovinylidene aromatic polymer used in the blends of the present invention and the method for making, is disclosed in U.S. Pat. No. 5,491,195, incorporated herein by reference.

The modified elastomeric polymer is preferably dissolved in the monovinylidene aromatic monomer and/or optional process diluent and supplied to a reactor configuration suitable for polymerization of the resin composition. Preferably the rubber solution is fed into a series of agitated plug flow reactors with a series of temperature controlled zones. Preferably, mineral oil and a diluent are also fed to the reactor(s). In a preferred embodiment, a chain transfer agent can also be added to the reaction mixture before the first zone or into the first or second zones of the first reactor.

Although thermal (heat initiated) polymerization conditions are preferred, it is also possible to use low levels of a polymerization initiator selected from the known initiators including the peroxide initiators including the peresters, for example, tertiary butyl peroxybenzoate, tertiary butyl peroxyacetate, dibenzoyl peroxide, and dilauroyl peroxide, the perketals, for example, 1,1-bis tertiary butyl peroxycyclohexane, 1,1-bis tertiary butyl peroxy-3,3,5-trimethyl cyclohexane, and di-cumyl peroxide, and the percarbonates; and photo chemical initiation techniques. These initiators may be employed in a range of concentrations dependent on a variety of factors including the specific initiator employed, the desired levels of polymer grafting and the conditions at which the mass polymerization is conducted. If used, from about 50 to about 300, preferably from about 100 to about 200, weight parts of the initiator are employed per million weight parts of monomer.

The sulfanylsilane-modified elastomeric polymer needs no special preparation steps for its use in an otherwise conventional rubber-modified monovinylidene aromatic polymer graft polymerization process.

During the polymerization, the elastomeric polymer will be grafted with aromatic polymer and dispersed into particles. The dispersed, grafted rubber particles will typically have grafted thereto and occluded therein, per one part by weight of the raw material un-grafted rubber polymer, at least about 0.5, preferably at least about 1, more preferably at least about 2, and more preferably at least about 3 parts by weight monovinylidene aromatic polymer and generally less than or equal to about 8, preferably less than or equal to about 7, more preferably less than or equal to about 6, and more preferably less than or equal to about 5 parts by weight of monovinylidene aromatic polymer grafted thereto and occluded therein.

As will be appreciated by those skilled in the art, the modified elastomeric polymers being used according to the present invention will enable desired rubber molecular structures and levels of grafting that will in turn enable the production of the broad ranges of desired particle sizes and morphologies that are currently known to be provided in the rubber modified monovinylidene aromatic polymers produced using the various other rubber components and graft polymerization techniques. In one embodiment of the present invention, for HIPS resins with high-gloss and/or transparency, the majority of the rubber particles dispersed within the rubber modified monovinylidene aromatic polymer matrix preferably have a core/shell particle morphology, for optimized balancing of surface gloss and toughness, preferably at least 70 percent, more preferably at least 80 percent and, more preferably for toughening and transparency, at least 90 percent of the rubber particles have a core/shell particle morphology. As used herein the term core/shell morphology means that the rubber particles have a thin outer shell and contain a single, central occlusion of the matrix polymer. This type of particle morphology is commonly also referred to in the art as "single occlusion" or "capsule" morphology.

In contrast, the terms "entanglement" or "cellular" morphology refer to various other, more complex rubber particle morphologies that are known in the art and have structures that can be described as "entangled", "multiple occlusions", "labyrinth", "coil", "onion skin" or "concentric circle". In another embodiment of the present invention, for ABS resins with good gloss and toughness properties, the majority of the rubber particles preferably have a cellular or multiple occlusion morphology. As used herein, the core/shell or cellular rubber particle percentage is a numerical percentage based on counting 500 particles in transmission electron micrographic photos (TEM's).

According to the present invention, rubber modified monovinylidene aromatic polymers are prepared having a very broad range of average rubber particle sizes, ranging from volume average rubber particle sizes of from at least about 0.05 micron (μ), preferably at least about 0.1μ, to less than or equal to about 10μ, preferably less than or equal to about 8μ. In order to provide desirable combinations of toughness and surface appearance properties in high impact polystyrene resins, the volume average particle size of the dispersed particles of elastomeric polymer is generally at least about 0.05, preferably at least about 0.1, more preferably at least about 0.2, more preferably at least about 0.3, even more preferably at least about 0.4 microns and generally less than or equal to about 8 microns, preferably less than or equal to about 7, preferably less than or equal to about 3 microns, more preferably less than or equal to about 2 microns and most preferably less than or equal to about 1.5 microns. For ABS compositions the volume average particle size of the dispersed of elastomeric polymer particles is generally at least about 0.3 microns, and generally less than or equal to about 4 microns. These particle sizes are best measured using light scattering based equipment like Coulter LS230 for the larger average rubber particle sizes (>0.2 micron) or transmission electron microscopy image analysis in the case of smaller average rubber particle sizes (<0.2). Those skilled in the art recognize that different sized groups of rubber particles may require some selection or modification of rubber particle measurement techniques for optimized accuracy.

Average particle size and other rubber particle statistics and percentages can be measured by means of the Beckham Coulter: LS230 light scattering instrument and software. The use of this equipment for this application is discussed in the manufacturer's instructions and literature and in the JOURNAL OF APPLIED POLYMER SCIENCE, VOL. 77 (2000), page 1165, *"A Novel Application of Using a Commercial Fraunhofer Diffractometer to Size Particles Dispersed in a Solid Matrix"* by Jun Gao and Chi Wu.

The amount of elastomeric polymer initially dissolved in the vinyl aromatic monomer is dependent on the desired concentration in the final, rubber reinforced polymer product, the degree of vinylidene aromatic monomer conversion during polymerization and the viscosity of the solution. The elastomeric polymer or rubber content of the final rubber modified monovinylidene aromatic polymer composition of the present invention in the case of diene/non-diene copolymeric elastomeric polymers is measured by counting only diene content from the copolymer rubber component and not including any copolymerized monovinylidene or other non-diene monomer that is part of the copolymer rubber.

The elastomeric polymer is typically used in amounts such that the reinforced polymer product contains at least about 1 weight percent, preferably at least about 2 weight percent and preferably at least about 3 weight percent of elastomeric polymer and generally less than or equal to about 20 weight percent, preferably less than or equal to about 17 weight percent and more preferably less than or equal to about 15 weight percent, based on the total weight of the vinyl aromatic monomers and elastomeric polymer (rubber) components.

In the specific situation of HIPS resins, the elastomeric polymer is typically used in amounts such that the reinforced polymer product preferably contains at least about 3 weight percent, preferably at least about 4 weight percent of elastomeric polymer and generally less than or equal to about 15 weight percent, preferably less than or equal to about 12 weight percent based on the total weight of the vinyl aromatic monomers and elastomeric polymer (rubber) components.

In the specific situation of ABS-type resins, the elastomeric polymer is typically used in amounts such that the reinforced polymer product preferably contains at least about 5 weight percent, preferably at least about 8 weight percent of elastomeric polymer and generally less than or equal to about 20 weight percent, preferably less than or equal to about 15 weight percent based on the total weight of the vinyl aromatic and acrylonitrile monomers and elastomeric polymer (rubber) components.

Other additives may be included in the compositions of the present invention, such as flow promoters, lubricants, antioxidants, mold release agents, mineral oil, other plasticizers and the like.

The material is devolatilized and pelletized according to the known techniques. As known to those skilled in this area of technology, the devolatilization conditions can be used to adjust the crosslinking of the rubber particles and to thereby provide optimized mechanical properties.

The novel polymer compositions of this invention are preferably prepared directly as the product of a solution or mass polymerization process as discussed above. Alternatively, these directly prepared products can be used in a blend with additional amounts of one or more other, separately prepared monovinylidene aromatic monomer polymers or copolymers to engineer materials with a somewhat different range of cost/property balances as might be needed for some packaging or container applications. Alternatively, the final products could be prepared by blending an amount of separately prepared monovinylidene aromatic (co)polymer with a rubber-modified polymer component having been previously graft polymerized to provide the rubber particle morphology and distribution in amounts needed to provide the final product rubber content in the proper range. Examples of other monovinylidene aromatic monomer polymers or copolymers which can be blended with or used to provide the compositions according to the invention include, but are not limited to, general purpose polystyrene, high impact polystyrene, monovinylidene aromatic copolymers (such as poly(styrene-acrylonitrile), styrene/diene block copolymers, styrene/diene random copolymers, vinyl aromatic/olefin monomer interpolymers (such as ethylene/styrene copolymers).

In other aspects of the present invention, therefore, there are provided improved injection molded articles, thermoformable sheets or films, improved thermoformed articles, an improved process for preparing thermoformed articles, an improved process for providing extrusion blow molded articles, and an improved process for providing injection stretch blow molded articles. In these aspects of the invention, the resin compositions as described above provide surprising combinations of processability, recyclability, toughness, gloss, transparency and other properties compared to prior art and commercially available resins and the articles prepared from them. In another embodiment, the compositions described above can be used to prepare multilayer sheet or film having, for example, three layers comprising a core or middle layer of a composition described above and outer layers of another resin located on each side.

The following examples are provided to illustrate the present invention. The examples are not intended to limit the scope of the present invention and they should not be so interpreted.

EXAMPLES

Experiment 1—Preparation of a Chain End Modified Elastomeric Polymer

A chain end modified elastomeric polymer according to the following formula:

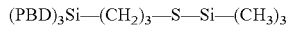

and comprising also "unprotected" modified elastomeric polymer, was prepared as described below; where $(PBD)_3$ refers to three chains or branches of polybutadiene. It should also be noted that the reaction product will also include a minor, statistical amount of the chain end modified elastomeric polymer according to the following formula where there has not been complete replacement of methoxy (—OMe) with PBD chains:

The polymerization was performed in a double wall 40 liter steel reactor which was first purged with nitrogen before the addition of organic solvent, monomers, polar coordinator compound and the initiator compound. Into the reactor were added 9400 g cyclohexane as solvent and 1660 g of butadiene as monomer and the polymerization reactor was tempered to 55° C. The mixture was stirred for 10 minutes, followed by titration with n-butyl lithium to remove traces of moisture or other impurities. Additional 16.58 mmol of n-butyl lithium was added to start the polymerization reaction. The polymerization was performed for 80 minutes allowing the polymerization temperature to increase to 85° C. within 45 minutes. Afterwards, 3.94 mmol of modifier (MeO)3-Si—(CH$_2$)$_3$—S—Si(CH$_3$)$_3$ was added. For the termination of the polymerization process, the polymer solution was added into methanol and 2 g Irganox 1520 as stabilizer. This mixture was stirred for 15 minutes. The resulting polymer solution was then stripped with steam for 1 hour to remove solvent and other volatiles, and dried in an oven at 70° C. for 30 minutes. The resulting elastomer properties are summarized in Table 1.

Experiment 2

A generally comparable but non-modified rubber was prepared according to procedure described in Experiment 1 with the exceptions that a 10 liter reactor was used, 4695 g cyclohexane and 826 g butadiene were charged instead of 9400 cyclohexane and 1660 g butadiene and instead of 16.58 mmol of n-butyl lithium, 8.25 mmol were used. In addition, instead of the 3.94 mmol of modifier (MeO)3-Si—(CH$_2$)$_3$—S—Si(CH$_3$)$_3$, 1.482 mmol of tetramethoxysilane were added. Non functionalized rubber properties are given in Table 1.

TABLE 1

|  | Mw | Mn | Mw/Mn | SV (mPa·s) | Mooney | Tg °C. | Cis Wt % | Trans Wt % | Vinyl Wt % |
| --- | --- | --- | --- | --- | --- | --- | --- | --- | --- |
| Experiment 1 | 380175 | 261368 | 1.457 | 77 | 43 | <0 | 43.2 | 48.4 | 8.4 |
| Experiment 2 | 436480 | 281200 | 1.552 | 85 | 45 | <0 | 43.2 | 48.4 | 8.4 |

Experiments 3 and 4

In Experiment 3 a rubber modified monovinylidene aromatic polymer composition was prepared from the silane sulfide chain end modified elastomeric polymer prepared in Experiment 1 above and was compared to a generally comparable high impact polystyrene (HIPS) prepared in Experiment 4 with the unmodified, comparison polybutadiene rubber prepared in Experiment 2 shown in Table 1, above. Both resins were prepared under the conditions summarized in Table 2 using the feed composition shown in Table 3 below by dissolving the rubber materials in styrene and ethyl benzene diluent to prepare a 4% rubber feed solution of 10% ethyl benzene, and 85% styrene. The rubber feed was charged into a 1.4 kg size glass reactor equipped with an Auger type agitator and heating elements. The polymerizing solutions were submitted to the temperature and agitation profiles described in Table 2. At the end of this profile the polymerization reaction mixtures were then devolatilized in a vacuum oven at 240° C. for approximately 1 hour. The polymers were then ground, extruded into granules and tested according to the methods described further below with the test results shown in Table 4, below.

TABLE 2

| | Polymerization Conditions | | |
| --- | --- | --- | --- |
| STEP | Setpoint Temperature, ° C. | TIME, Min | AGITATION, RPM |
| 0 | 25 | 0 | 75 |
| 1 | 123 | 50 | 75 |
| 2 | 129 | 50 | 75 |
| 3 | 134 | 50 | 40 |
| 4 | 138 | 80 | 40 |
| 5 | 142 | 60 | 25 |
| 6 | 150 | 60 | 25 |
| 7 | 160 | 60 | 25 |

TABLE 3

| | Feed Composition | |
| --- | --- | --- |
| | Experiment 3 | Experiment 4 |
| Rubber Used | Experiment 1 rubber | Experiment 2 rubber |
| Rubber Type | Modified | Reference |
| | Feed Composition | |
| % EB | 10.05 | 10.01 |
| % Rubber | 4.00 | 4.00 |
| % Styrene | Balance | Balance |

TABLE 4

| | Properties | |
| --- | --- | --- |
| | Experiment 3 | Experiment 4 |
| Rubber Used | Experiment 1 rubber | Experiment 2 rubber |
| | Properties of the monovinylidene aromatic polymer | |
| Final Mw (g/mole) | 238,900 | 241,700 |
| Final Mn (g/mole) | 108,100 | 110,000 |
| Mw/Mn | 2.2 | 2.2 |
| Prod RPS mean (micron) | 0.35 | 1.05 |
| Morphology | >80% core shell | >50% cellular |
| | Compression Molded Sample Properties | |
| Ty (MPa) | 39.08 | 33.05 |
| Tr (MPa) | 37.18 | 30.54 |
| Tm (MPa) | 2592 | 2433 |
| Izod (J/m) | 26.6 | 53.3 |
| MFR (g/10 min) | 2.3 | 2.5 |
| Fm (MPa) | 2670 | 2476 |
| Fs (MPa) | 75.3 | 56.3 |
| | Injection Molded Sample Properties | |
| Haze (%) | 25 | 50 |

Testing Methods

The Mw and Mn molecular weights (molar mass) of the final product were measured using gel permeation chromatography based on polystyrene standards. Rubber particle size (RPS) was measured using a light scattering device from Coulter Counter LS230.

Tensile testing (Ts—tensile strength at yield; Tr—tensile strength at rupture and Tm—Tensile modulus) was done according to ASTM D-638 on compression molded specimens and is given in mega pascals (M Pa). Flexural testing (Fm—flexural modulus; Fs—flexural strength) was done according to ASTM D 790 method on compression molded specimens and reported in M Pa. Izod impact resistance was measured on 3.2 mm thick compression molded specimens according to ASTM-D256 method and is given in Joules per meter (J/m). Melt flow rate was measured according to ASTM D1133 condition G (200° C./5 Kg) and is reported in grams per 10 minutes (g/10 min). Haze was tested according to ASTM D-1003-95 method on a injection molded plaque of 0.5 mm thickness free from topological defects.

As can be seen in Table 3 above, the resins according to the present invention are capable of providing improved combinations of properties including particularly in this case, improved transparency, while maintaining an acceptable balance of tensile, flexural and toughness physical/mechanical properties.

The invention claimed is:

1. A rubber modified monovinylidene aromatic polymer composition comprising:
   a) a monovinylidene aromatic polymer; and
   b) from about 1 to about 40 percent by weight sulfanylsilane modified elastomeric polymer dispersed as particles grafted with monovinylidene aromatic polymer.

2. A polymer composition according to claim 1 comprising grafted sulfanylsilane modified elastomeric polymer as represented by the following formula:

$$(D)_z(RO)_x(R)_y Si\text{---}R'\text{---}S\text{-Polymer}$$

wherein:
D is an elastomeric polymer chain,
x is an integer selected from 0, 1 and 2;
y is an integer selected from 0, 1, and 2;
z is an integer selected from 1, 2 and 3, $$x+y+z=3,$$

Si is silicon; S is sulfur; O is oxygen;
R is the same or different and is $(C_1\text{-}C_{16})$ alkyl;
R' is aryl, and alkyl aryl, or $(C_1\text{-}C_{16})$ alkyl; and
Polymer is graft polymerized monovinylidene aromatic polymer.

3. A polymer composition according to claim 1 wherein D in the elastomeric polymer is a conjugated diene polymer chain.

4. A polymer composition according to claim 3 wherein D in the elastomeric polymer is a conjugated diene homopolymer rubber chain.

5. A polymer composition according to claim 4 wherein D in the elastomeric polymer is a polybutadiene chain.

6. A polymer composition according to claim 3 wherein D in the elastomeric polymer is a styrene-butadiene copolymer chain.

7. A polymer composition according to claim 1 where at least about 70 percent of the elastomeric polymer particles have a core/shell morphology.

8. A polymer composition according to claim 1 wherein the volume average particle size of the dispersed elastomeric polymer particles is from about 0.05 to about 10 microns.

9. A polymer composition according to claim 1 where the monovinylidene aromatic matrix polymer is polystyrene.

10. A polymer composition according to claim 9 comprising from about 3 to about 15 percent by weight elastomeric polymer.

11. A polymer composition according to claim 9 wherein the volume average particle size is from about 0.4 to about 1.5 microns.

12. A polymer composition according to claim 1 wherein the monovinylidene aromatic matrix polymer is poly(styrene-acrylonitrile).

13. A polymer composition according to claim 12 comprising from about 5 to about 20 percent by weight elastomeric polymer.

14. A polymer composition according to claim 12 wherein the volume average particle size is from about 0.3μ to about 4 microns.

15. A process for preparing a rubber modified monovinylidene aromatic polymer composition comprising polymerizing the monovinylidene aromatic polymer in the presence of from about 1 to about 40 percent by weight sulfanylsilane modified elastomeric polymer.

16. The process according to claim 15 wherein the sulfanylsilane modified elastomeric polymer is represented by the formulae:

$$(D)_z(RO)_x(R)_y Si\text{---}R'\text{---}S\text{---}SiR_3 \text{ and } (D)_z(RO)_x(R)_y Si\text{---}R'\text{---}S\text{---}H$$

wherein:
D is an elastomeric polymer chain,
x is an integer selected from 0, 1 and 2;
y is an integer selected from 0, 1, and 2;
z is an integer selected from 1, 2 and 3, $$x+y+z=3,$$

Si is silicon; S is sulfur; O is oxygen;
R is the same or different and is $(C_1\text{-}C_{16})$ alkyl; and
R' is aryl, and alkyl aryl, or $(C_1\text{-}C_{16})$ alkyl.

17. The process according to claim 16 where, in the elastomeric polymer, D is a polybutadiene chain.

18. A thermoformed article prepared from a polymer composition according to claim 1.

19. An injection molded article prepared from a polymer composition according to claim 1.

20. A sheet or film prepared from a polymer composition according to claim 1.

* * * * *